United States Patent [19]

Cunningham

[11] Patent Number: 4,791,171

[45] Date of Patent: Dec. 13, 1988

[54] SILYLATED POLY(VINYL)PHENOL POLYMERS

[75] Inventor: Wells C. Cunningham, Wellesley, Mass.

[73] Assignee: Shipley Company Inc., Newton, Mass.

[21] Appl. No.: 948,330

[22] Filed: Dec. 31, 1986

[51] Int. Cl.$^4$ .............................................. C08F 8/00
[52] U.S. Cl. ................................... 525/100; 526/279
[58] Field of Search ......................... 525/100; 526/279

[56] References Cited

U.S. PATENT DOCUMENTS 4,564,576  1/1986  Saigo et al. ......................... 430/197
4,624,909  11/1986  Saotome et al. ..................... 430/192

FOREIGN PATENT DOCUMENTS 0178208  9/1984  European Pat. Off. .

OTHER PUBLICATIONS

Saotome, Y., et al., *J. Electro Chem. Soc.:Solid-State Sci. and Tech.*, 132 (1985), 909.

Biguez, F., et al., at the Micro Circuits Engineering Conference in Berlin, 1984, Presented on behalf of Commisseriat a l'Energie Atomique, France.

Hofer, D., et al. *SPIE/Advances in Resist Technology*, 469 (1984), 16.

Parasczak, J., Plasma Processing of Polymers, IBM, T. J. Watson Research Center, Yorktown Heights, Presented at 16th Northeast Regional Meeting, ACS, 6/86. Excerpts Nos. 68–71 from Program and Abstracts of 16th Northeast Regional Meeting, ACS, 6/86.

Shaw, J. M., et al., *Polymer Eng. Sci.*, 23 (18), 1054, Dec., 1983.

Kawazu, R., et al., *J. Vac. Sci. Technol.*, B4(1) (Jan.-/Feb.,1986), 409.

*Primary Examiner*—Joseph L. Schofer
*Assistant Examiner*—Bernard Lipman
*Attorney, Agent, or Firm*—Robert L. Goldberg

[57] ABSTRACT

Novel partially silylated polyvinylphenol polymers of the Formula (I) are disclosed:

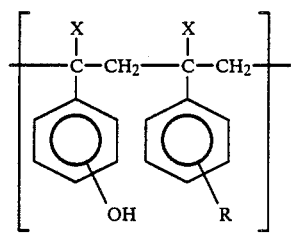

Formula (I)

wherein X is H or $CH_3$; R is —OH or

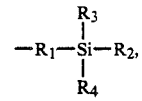

wherein $R_1$ is —O or —O$(CH_2)_n$, n is 1 to 4, and $R_2$, $R_3$ and $R_4$ are independently selected from 1–4 carbon alkyl, aryl or benzyl, and wherein the average molecular weight of the silylated polymer is from about 2,700 to 22,000 and the average percent by weight silicon is from about 3% to 12%. This invention also relates to blends of such polymers to yield a polymer having a predetermined average molecular weight and percent by weight silicon.

10 Claims, No Drawings

SILYLATED POLY(VINYL)PHENOL POLYMERS

BACKGROUND OF THE INVENTION

This invention relates to a novel poly(vinyl)phenol polymers partially silylated at the phenolic hydroxyl and to methods for making such polymers and using such polymers in the fabrication of devices used in the electronics industry and in particular to fabrication utilizing lithographic processes.

Photolithography is a commonly used technique in transposing a pattern to a base, which utilizes a radiation-sensitive polymer generally referred to as photoresist. In photolithography the resist material is applied as a thin coating over some base and subsequently exposed in an image-wise fashion (through a mask) such that radiation, e.g., U.V. or visible light, x-rays, electron beam, strikes selected areas of the resist material. The exposed resist is then subjected to a development step. Depending upon the chemical nature of the resist material, the exposed areas may be rendered more soluble in some developing solvents than the unexposed areas, thereby producing a positive tone image of the mask. Conversely, the exposed areas may be rendered less souble producing a negative tone image of the mask. The net effect of this process is to produce a three dimensional relief image in the resist material that is a replication of the opaque and transparent areas on the mask.

The areas of resist that remain following the imaging and developing processes are used to mask the underlying substrate for subsequent etching or other image transfer steps. If, for example, the underlying substrate or base were $SiO_2$, immersion of the structure into an etchant such as buffered hydrofluoric acid ("wet etching") or in an organo-halide plasma or other reactive ion etching ("RIE") medium, would result in selective etching of the $SiO_2$ in those areas that were bared during the development step. The resist material "resists" the etchant and prevents it from attacking the underlying substrate in those areas where it remains in place after development. After the exposed material has been removed by plasma or wet chemical etching, the photoresist mask is then taken off.

Photoresists are used in the fabrication of semiconductors. The photoresist is coated onto the surface of a semiconductor wafer and then imaged and developed. Following development, the wafer is typically etched with an etchant whereby the portions of the wafer exposed by development of the photoresist are dissolved while the portions of the wafer coated with photoresist are protected, thereby defining a circuit pattern.

The positive-working resists comprise a radiation sensitive compound in a film-forming polymer binder. The radiation sensitive compounds, or sensitizers as they are often called, most frequently used where the radiation is light are esters and amides formed from o-quinone diazide sulfonic and carboxylic acids. These esters and amides are well known in the art and are described by DeForest, Photoresist Materials and Processes, McGraw Hill Book Company, New York, pages 47–55 (1975), incorporated herein by reference. These light sensitive compounds, and the methods used to make the same, are all well documented in prior patents including German Pat. No. 865,140 granted Feb. 2, 1953 and U.S. Pat. Nos. 2,767,092; 3,046,110; 3,046,112; 3,046,119; 3,046,121; 3,046,122 and 3,106,465, all incorporated herein by reference. Additional sulfonic amide sensitizers that have been used in the formulation of positive-acting photoresists are shown in U.S. Pat. No. 3,637,384, also incorporated herein by reference. These materials are formed by the reaction of a suitable diazide of an aromatic sulfonyl chloride with an appropriate resin amine. Methods for the manufacture of these sensitizers and examples of the same are shown in U.S. Pat. No. 2,797,213 incorporated herein by reference. Other positive-working diazo compounds have been used for specific purposes. For example, a diazo compound used as a positive-working photoresist for deep U.V. lithography is Meldrum's diazo and its analogs as described by Clecak, et al., *Technical Disclosure Bulletin*, Volume 24, Number 4, September 1981, IBM Corporation, pp 1907 and 1908. An o-quinone diazide compound suitable for laser imaging is shown in U.S. Pat. No. 4,207,107. The aforesaid references are also incorporated herein by reference.

A class of negative resists comprising a negative acting sensitizer in a polymer binder is described by Iwayanagi, et al., *IEEE Transactions on Electron Devices*, Vol. ED-28, No. 11, November, 1981, incorporated herein by reference. The resists of this reference comprise an aromatic azide in a phenolic binder. It is believed that these resists are first disclosed and claimed in U.S. Pat. No. 3,869,292, also incorporated herein by reference. Additional aromatic azide sensitizers are disclosed by DeForest, supra, and U.S. Pat. Nos. 2,940,853 and 2,852,379, incorporated herein by reference. The most familiar negative photoresists are two-component, resist materials which consist of a cyclized synthetic rubber matrix resin which is radiation insensitive but forms excellent films. This resin is combined with a bis-arylazide sensitizer.

Photoresist compositions are well known in the art and are described in numerous publications including DeForest, supra; Introduction to Microlithography, supra, Chap. 3, Willson, C. G. Silicon containing polymers have been widely studied as components of photoresists used in processes involving oxygen-RIE pattern transfer. Such polymers typically have high oxygen-RIE sensitivity. In general, the etch rate of organosilicon polymers in an oxygen plasma is dependent only on the silicon content. See, e.g., *Materials for Microlithography*, Thompson, L. F., et al., eds., A.C.S. Symposium Series 266, Chap. 15, 1984.

One class of uv sensitive, oxygen RIE resistant silicon containing polymers used in bilayer processes is the polysiloxanes (See, e.g., Hatzakis, M. J., *J. Vac. Sci. Technol.*, 26 (1979) 2984). These polymers can function both as negative resists and oxygen RIE barriers.

Other silicon containing polymers for use in photoresists are known in the art. For example, Saotome, Y., et al., *J. Electro Chem. Soc.: Solid-State Sci. and Tech.*, 132 (1985) 909, disclose a silicon containing polymer for use in a positive photoresist as the thin top or resolution layer in a bi-layer resist system. This photoresist, a partly trimethylsilylmethylated resorcinol-formaldehyde resin mixed with a naphthoquinonediazide, was thinly coated onto a thick layer of polyimide resin on a silicon wafer.

Kawazu, R., et al., J. Vac. Sci. Technol. B4(1) (January/February 1986) 409, disclosed silyl ethers of novolak and low molecular weight resist for use in tri-level and bi-level resist systems. U.S. Pat. No. 4,564,576 teaches a polymer having allyl groups each attached to a silicon atom as a resist material.

Essentially 100% silylated poly(vinyl)phenol polymers for use in a positive optical resist for bilayer resist systems were disclosed by Buiguez, F., et al. at the Micro Circuits Engineering Conference in Berlin in 1984 by a Poster Paper presented on behalf of Commissariat a l'Energie Atomique, France. See also EPO No. 0 178208. The polymers used in making these resists are produced by first silylating vinyl phenol and then polymerizing the silylated phenol by a free radical polymerization process. The resists contain at least one salt capable of being converted into a Brunsted acid upon appropriate irradiation and one photosensitizer. According to these workers, the resist can be developed and the substrate simultaneously etched by dry processing with a gaseous plasma.

Silicon containing polymers known in the art for use in making electronic devices suffer from various disadvantages such as, for example, development requiring organic solvents, complicated procedures for synthesizing the polymers, halogen and other metal ion contamination. Thus, new silicon containing polymers are being sought, in particular, for use in the fabrication of devices in the electronics industry.

SUMMARY OF THE INVENTION

The present invention is directed to partially silylated poly(vinyl)phenol polymers. The poly(vinyl)phenol polymers may be prepared by derivitization of PVP at the phenolic hydroxyls.

In some embodiments of this invention, it may be desirable to incorporate a sensitizer directly into the structure of the polymer. In yet other embodiments, it may be desirable to blend the silylated polymers of the present invention with other polymers, such as PVP or novolac.

The partially silylated poly(vinyl)phenol polymers of the instant invention are useful in the fabrication of devices used in the electronics industry and in particular to fabrication utilizing lithographic processes and are characterized by an increased resistance to oxygen reactive ion etching over conventional poly(vinyl)phenol polymers. More particularly, such silylated partially poly(vinyl)phenol polymers are useful in the fabrication of photoresist compositions. The photoresist may be a positive acting or a negative acting photoresist dependent upon the selection of the sensitizer, and comprises a sensitizer such as a diazo compound in an alkali soluble polymer binder comprising a silylated poly(vinyl)phenol polymer.

Partially silylated poly(vinyl)phenol polymers in accordance with the present invention having a molecular weight range from about 2,700 to 22,000 and a percent by weight silicon ranging from about 3% to 12% are particularly useful in preparing photoresist compositions. The desired percent by weight of silicon may sometimes be achieved by blending two or more silylated poly(vinyl)phenol polymers of the present invention.

Partially silylated poly(vinyl)phenol polymers in accordance with the present invention also are useful for forming oxide dielectric layers and photoresists for metal etching.

DETAILED DESCRIPTION OF THE INVENTION

Partially silylated poly(vinyl)phenol polymers according to the present invention have been prepared at varying levels of silicon derivitization and with parent polymers having varying molecular weights. Such polymers comprise the repeating unit of Formula (I):

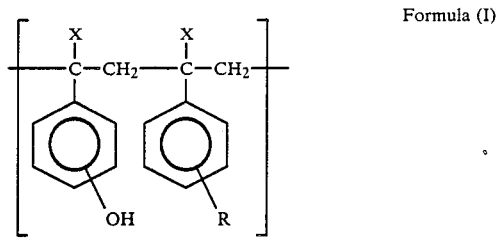

Formula (I)

wherein X is —H or —CH$_3$, R is —OH, or

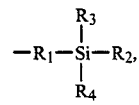

wherein R$_1$ is —O or —O—(CH$_2$)$_n$, n is 1 to 4, and R$_2$, R$_3$ and R$_4$ are independently selected from 1-4 carbon alkyl, aryl or benzyl.

In other embodiments of this invention, it may be desirable to incorporate a sensitizer into the structure of the polymer. Orthoquinone diazide sensitizers and aromatic azide sensitizers are suitable for such purposes. In such cases R is further selected from an aromatic azide or the group of esters and amides of o-quinone diazide sulfonic or carboxylic acids.

In yet other embodiments of the present invention, the partially silylated poly(vinyl)phenol polymers may be blended with other polymers such as a poly(vinyl)phenol polymer which has not been silylated or a novolak. The benefits of such blending are known to those skilled in the art.

Poly(vinyl)phenol polymers (PVP) may be prepared by block polymerization, emulsion polymerization or solution polymerization of vinylphenol in the presence of a cationic catalyst such as boron trifluoride etherate. Such procedures are well known in the art. Various processes suitable for production of vinyl phenol are described in detail, for example, in the *Journal of Organic Chemistry*, Volume 3, 1958, pp 544-549. Furthermore, both PVP and vinylphenol are availablae commercially from a number of sources.

The partially silylated polymers of Formula (I) may be prepared by the incomplete derivatization of poly(vinyl)phenol polymers with organosilicon moieties at a portion of the phenolic hydroxide using conventional techniques. Such derivatization may be accomplished by use of organosilicon compounds capable of transferring a trisubstituted silylmethyl group known to those skilled in the art, such as trimethylsilylmethyl chloride, bromide, mesylate or tosylate. Such derivatization may also be accomplished by use of trisubstituted silylating reagents known to those skilled in the art, such as hexamethyldisilazane; trimethylsilylchloride, bromide, cyanide or mesylate; or O,N'-bis-trimethylsilylacetamide; or phenyldimethylsilylchloride or t-butyldimethylsilylchloride.

The partially silylated polymers of Formula (I) can be used in monolayer and multi-layer resists. Such resists are prepared using conventional methodology.

For example, one or more partially silylated poly(vinyl)phenol polymers according to the present invention plus a photosensitizer and other components known to those skilled in the art may be used in bilayer resists to form the patternable overlying layer. The material utilized for the underlying layer in such a bilayer system is not critical and typically includes organic materials such as novolac and polyimide resins, e.g., S1400, a product of Shipley Co., Inc., which is basically a novolak resin with a substituted naphthoquinone diazide solution inhibitor, baked at 200° C. for 1.0 hour, and (2) polyimides such as PMGI, another product of Shipley Co., Inc. The underlying layer material preferably is removable with an oxygen plasma and does not appreciably dissolve in the solvent utilized to form the overlying layer. (See, e.g., *Introduction to Modern Lithography*, supra, Chapter 5, Mucha, J. A., and Hess, D. W. and Paulsen, supra, for a description of the removal of materials through plasma techniques.) The thickness of the underlying layer depends on the size of the surface irregularities in the substrate. For typical structure utilized in the formation of semiconductor devices, layer thicknesses greater than 1 $\mu$m yield an essentially planar surface. However, thicknesses greater than 1 $\mu$m, are often used in associated processes such as passivation.

The thickness of the overlying layer comprising one or more silylated poly(vinyl)phenol polymers depends on the desired resolution. Generally, the thicker the layer, the poorer the resolution. For resolutions less than 2 mm, layer thicknesses in the range of about 0.3 $\mu$m to 1.0 $\mu$m are generally utilized. Suitable layer thicknesses for either the underlying or overlying layers are easily obtained by conventional techniques such as by dissolving the material that is to form the layer in an appropriate solvent and spin coating the final layer onto the substrate. (A description of spin coating is found in *Photoresist Materials and Processes*, W. S. DeForest, page 223, McGraw-Hill, New York, 1975.) The spinning speed utilized in the coating procedure determines the layer thickness and is controlled to yield the desired result. Suitable solvents for formation of a liquid photoresist include alcohols, ketones, ethers, amides such as dimethyl formamide, esters such as Cellosolve esters and glycol esters, glycol ethers, and other solvents and mixtures as is known in the art.

The optimum molecular weight of the partially silylated polymers of Formula (I) and the percent by weight silicon content thereof will vary depending upon the desired application. For example, the silicon content of such polymers influences the etch rate, and this must be considered in resist applications. Furthermore, both the silicon content and the average molecular weight of the resulting polymer will influence lithographic behavior in such applications.

Control Samples are easily utilized to determine the optimum molecular weight and average percent silicon of polymers within the scope of the present invention for a particular application. Typically, molecular weights in the range of from about 2,700 to 22,000, with the average percent by weight of silicon ranging from about 3% to 12% are desirable. A preferred molecular weight range is from about 2,700 to 7,000, with average % by weight silicon ranging from about 5 to 11 percent. A particularly preferred polymer in accordance with the present invention for use in bilevel resists averages about 9% by weight silicon.

Dissolution rates of various resist formulations comprising silylated polymers according to the present invention were determined using a laser interferometric dissolution rate monitoring device built and used in accordance with techniques known to those skilled in the art. For example, when the silicon content of the resist drops from about 9% by weight to about 8% by weight for a starting polymer molecular weight of about 7,000, it was determined that the dissolution rate of the photoresist composition increases about three times (See Table 1, below). When the molecular weight drops from 7,000 to 5,000 while the percentage of silicon remains constant, the dissolution rate approximately quadruples (See Table 2, below). Dissolution rate ratio, $\psi_R$, changes with molecular weight and percent silicon, and is considered in selecting a desired polymer of this invention for such applications.

It was found in some cases that resists with improved lithography could be obtained by blending two or more partially silylated poly(vinyl)phenol polymers according to the present invention with one another. Two polymers for use according to the present invention, containing 10.4% and 8.0% by weight respectively, were blended to yield a polymer containing about 9% by weight silicon. The dissolution rate was investigated using the monitoring device described above (See Example 7, Table 5 below). The resist formed by using this blend produced a resist with an improved lithography over a resist formed by using a polymer of about 9% as defined by $\psi$ ratio and patterning.

As will be appreciated by those skilled in the art, in some instances other polymers such as unsilylated poly(vinyl)phenol polymers and novolak may be blended with the partially silylated poly(vinyl)phenol polymers of Formula (I).

Conventional photoactive compounds (PACs) well known to those skilled in the art as described above, such as, substituted diazonopthoquinones (positive resist) and bis-azides (negative resist), are used in formulating photoresists with the partially silylated polymers according to the present invention. Such PACs can be incorporated into the structure of a partially silylated poly(vinyl)phenol polymer according to the present invention (See Examples 1C and 3B, below) or the structure of the parent poly(vinyl)phenol polymer or blended with such partially silylated poly(vinyl)phenol polymers taught herein. By selecting the appropriate sensitizer, the photoresists can be imaged by deep U.V., electron beam, laser or any other activating energy conventionally used for imaging photoresists.

The glass transition temperature (Tg) of the partially silylated poly(vinyl)phenol polymers of the present invention is generally higher than 60° C., and usually ranges from about 64°–100° C.

Development of positive resists comprising one or more partially silylated polymers according to the present invention and which further incorporates substituted diazonaphthoquinone PACs was accomplished through the use of aqueous alkali solutions well known in the resist art. After the overlying layer was developed, its pattern was transferred to the underlying layer by subjecting the substrate to an oxygen plasma using techniques known to those skilled in the art.

In the semiconductor and hybrid circuit industries, passivation coatings are used in selective areas for serving as a hermetic seal. Requirements for this use are high temperature capability with image stability and good dielectric properties. The partially silylated polymers of this invention are suitable for such applications, especially after conversion to oxide in a plasma.

The partially silylated polymers of Formula (I) can also be used to form a monolevel photoresist over metal. See Example 8 below. The pattern is developed in a conventional manner. Then the wafer is exposed briefly to an oxygen plasma. The resulting silicon dioxide lines will stand up better to the subsequent metal plasma etching than would photoresist made with conventional silicon containing polymers.

The following examples are illustrative of the invention.

As used in the Examples below:

PVP followed by a number represents the molecular weight of the parent PVP polymer before derivitization with silicon.

TMS followed by a number represents the percent derivitization with silicon achieved.

Percent by weight silicon is based on the molecular weight of the silicon derivitized PVP polymer.

PAC represents the substituted 2,1,5-diazonaphthoquinone PAC used.

TMAH means tetra-methyl ammonium hydroxide.

MF312-CD27 means a 0.27N TMAH based developer available from Shipley Company.

MF312 means a 0.54N TMAH based developer available from Shipley Company.

EXAMPLE 1

Preparation of Polymers

A. O-Trimethylsilylpoly(vinyl)phenol

In a 3-neck flask a solution was prepared by the addition of 200 g of vacuum oven dried poly(vinyl)phenol (Maruzen Co., MW7000, dispersity 2.2) to 1250 ml dioxane at 85° C. with stirring. After dissolution was complete, a total of 20 ml triethylamine (Aldrich Chemical Co., dried by distillation from BaO) was added followed by dropwise addition of 80 ml hexamethyldisilazane over 15 minutes (Aldrich Chemical Co., 0.5 eq to prepare a 45% derivatized polymer).

The reaction was kept at 85° C. under an atmosphere of nitrogen for 48 hours. The apparatus was arranged for distillation and heating was increased until solvent began to distill (approximately 140° C.). When most of the solvent was gone the material was transferred to another flask and dried further by rotary evaporation. Final drying in a vacuum oven (120° C.) gave a brittle solid with 43% of the hydroxyl sites silylated as determined by NMR. The Tg of the material was 97° C.

B. O-Methyltrimethyl silylpoly(vinyl)phenol

In a round bottom flask a solution of 48.7 g methylacetoacetate in 300 ml dioxane was prepared. This solution was cooled with an ice bath and a suspension of 10.1 g (0.42 m) sodium hydride (Alfa) in 100 ml dioxane was added dropwise slowly over 1 hour.

The resulting light brown suspension was then added dropwise slowly into a rapidly stirred solution of 168.0 g poly(vinyl)phenol (Maruzen Co., MW7000, dispersity 2.2) and 58.3 ml (0.42 m) chloromethyltrimethylsilane (Petrarch Co.) in 1300 ml DMF at 90° C. The solution was reacted overnight at 90° C.

Solvent was distilled off at atmospheric pressure until approximately 400 ml of material remained. The reaction product was allowed to cool about 70° C. and 500 ml of methylethylketone was added. The resulting solution was washed thoroughly with water and the organic fraction dried over magnesium sulfate.

After filtration and removal of solvent by rotary evaporation, the material was dried in a vacuum oven at 120° C. for one day. Analysis by NMR showed that 25% of the hydroxy sites had been silylated. The Tg of the material was 91° C.

C. Preparation of O-Trimethylsilyl, O'-2,1,5 Diazonaphthoquinone Sulfonate Poly(vinyl)phenol A solution of 20 g of PVP5100 T50 (0.065M free hydroxyl sites) in 200 ml dioxane was prepared in a round bottom flask. Triethylamine (1.92 ml, 10% excess over amount necessary to react 20% of free hydroxyl sites) was added and the solution chilled with ice water. A concentrated solution of 2,1,5 diazonaphthoquinone sulfonylchloride (3.5 g, equivalent to 20% of unreacted hydroxyl sites) in dioxane was added dropwise into the stirred resin solution over 15 minutes.

Stirring was continued for 2 hours and the precipitated salt was filtered. For test purposes the resin was isolated without further washing by stripping the solvent in a rotary evaporator.

The resulting material was subjected to GPC analysis (Waters LC system and columns). A refractive index detector and a UV detector at 400 nm where the resin is transparent showed the chromatographic trace to be of the same shape. This implies that the PAC is distributed evenly throughout the resin molecular weight.

EXAMPLE 2

EFFECT OF MOLECULAR WEIGHT AND SILICON CONTENT ON DISSOLUTION RATE

Wafers were spin coated using techniques well known to the skilled artisan, with the desired formulation according to the present invention and dissolution rate ratios determined. Duplicate wafers were prepared. One such wafer was exposed without a mask to (usually) broadband UV radiation to an approxmate total energy as stated below (measured at 436 nm) and the other was not exposed. Both the exposed and unexposed waffers were placed in a holder which contains a fiber optic lead from a 6328 Å laser which shines on the coated surface. Upon immersion of the holder in a developer, the film began to dissolve generating a sinusoidal interference curve on a strip-chart recorder. Rates were derived from the period of these curves (See Table 1 below).

Dissolution rate ratios were determined of wafers, spin coated as described above, with the desired formulation of the present invention. In this case the desired formulations do not contain a PAC (See Table 2 below).

TABLE 1

| DISSOLUTION RATES - PAC CONTAINING FORMULATIONS | | | | |
|---|---|---|---|---|
| | | DISSOLUTION ARTE (Å/SEC) | | DISSOLUTION RATE RATIO ($\psi_R$)** |
| FORMULATION* | DEVELOPER | UNEXPOSED | Exposed (3000 mJ/cm$^2$) | |
| PVP7000 TMS53 (9.4 wt. %.Si)- PAC-DIGLYME (4:1:11) | MF-312 | 26.6 | 208.7 | 6.8 |
| PVP7000 TMS43 (8.0 wt. % Si)- | MF-312 | 108.6 | 951.4 | 7.8 |

TABLE 1-continued

| DISSOLUTION RATES - PAC CONTAINING FORMULATIONS | | | | |
|---|---|---|---|---|
| | | DISSOLUTION ARTE (Å/SEC) | | DISSOLUTION RATE RATIO |
| FORMULATION* | DEVELOPER | UNEXPOSED | Exposed (3000 mJ/cm$^2$) | ($\psi_R$)** |
| PAC-DIGLYME (4:1:11) | | | | |
| PVP5700 TMS58 (10.1 wt. % Si)- PAC-DIGLYME (4:1:11) | MF-312 | 33.9 | 318.8 | 8.4 |
| PVP2700 TMS51 (9.1 wt. % Si)- PAC-DIGLYME (4:1:11) | MF-312 | 819.5 | 8314.3 | 9.1 |

*Thickness: about 0.9 to 1.1 μm

**$\psi_R = \left( \dfrac{\text{Exposed Dissolution rate} - \text{unexposed dissolution rate}}{\text{unexposed dissolution rate}} \right)$

TABLE 2

| DISSOLUTION RATES FORMULATIONS WITHOUT PAC | | | |
|---|---|---|---|
| FORMULA-TION | % BY WEIGHT SILICON | MF312 (TMAH 0.54 N) | MF312CD27 (TMAH 0.27 N) |
| P7000 T20 | 4.1 | 4363.6 | 263.00 |
| P7000 T30 | 5.9 | 256.0 | 28.80 |
| P7000 T32 | 6.2 | 172.4 | 14.30 |
| P7000 T43 | 8.0 | 50.0 | 7.70 |
| P7000 T53 | 9.4 | 6.0 | 0.74 |
| P7000 T84 | 13.0 | 2.8 | 0.00 |
| P2700 T51 | 9.1 | 58.0 | 10.0 |
| P5100 T51 | 9.0 | 25.0 | 4.2 |
| P5700 T58 | 10.0 | 14.9 | 2.6 |
| P5100 T60 | 10.3 | 12.1 | 2.3 |

EXAMPLE 3

RESIST CONTRAST—SCANNING WEDGE

In both Examples 3A and 3B below, Resist Contrast (gamma) was evaluated by scanning wedge 4 (See U.S. Pat. No. 4,618,233, which is incorporated herein by reference) for various formulations using a standard concentration of PAC. In Examples 3A below, PAC was blended with a partially silylated poly(vinyl)phenol polymer prepared in accordance with the present invention. In Example 3B, below, PAC was incorporated into the structure of a partially silylated poly(vinyl)-phenol polymer according to the present invention.

A. Blended PAC

A wafer spin coated with a desired formulation comprising partially silylated polymers of Formula (I) was placed on a moveable stage and exposed to a known intensity monochromatic light source as the stage passed the light source at a known speed. This resulted in a linear gradient of exposure across the wafer.

The wafer was developed for a predetermined time. The wafer was then placed back on the stage and a laser interferometric thickness measuring device was used to scan the wafer. This gave a readout of thickness across the wafer which is correlated with the known exposure intensity gradient the wafer received.

When the thickness versus log exposure is plotted a curve results, the slope of which at zero thickness is called gamma. The resist sensitivity is the exposure at zero thickness (See Tables 3 and 4 below).

TABLE 3

| RESIST CONTRAST OF PVP5700 TMS58 SYSTEM** | | | | |
|---|---|---|---|---|
| RESIST SENSITIV-ITY, E° | DEVEL-OPER | DEVELOP-ING TIME | GAMMA* | THICKNESS LOSS OF UNEXPOSED REGION(%) |
| 85 | MF-312-CD-27 | 3 min. | 0.92 | 26.0 |
| 64 | MF-312 | 30 sec. | 0.91 | 20.8 |
| 24.5 | MF-312-CD-27 | 7 min. | 0.83 | 46.7 |
| 20 | MF-312 | 1 min. | 0.77 | 44.8 |
| 191 | MF-312-CD-27 | 2 min. 30 sec. | 0.58 | 20.5 |

*Original Thickness: 0.92 μm
**Formulations: PVP5700 TMS58 (10.1 wt. % Si)-PAC-DIGLYME (4:1:11)

TABLE 4

| RESIST CONTRAST OF PVP7000 TMS43 SYSTEM** | | | | |
|---|---|---|---|---|
| RESIST SENSITIV-ITY, E° | DEVEL-OPER | DEVELOP-ING TIME | GAMMA* | THICKNESS LOSS OF UNEXPOSED REGION(%) |
| 98.6 | MF-312-CD-27 | 1 min. 30 sec. | 1.13 | 18.6 |
| 61.7 | MF-312-CD-27 | 2 min. | 1.25 | 25.1 |
| 36.3 | MF-312-CD-27 | 3 min. | 1.17 | 36.9 |
| 19.1 | MF-312 | 30 sec. | 0.82 | 47.3 |
| — | MF-312 | 1 min. | | clear most of the photoresist |

*Original thickness: 1.1 μm
**Formulations: PVP7000 TMS43 (8.0 wt. % Si)-PAC-DIGLYME (4:1:11)

B. Contrast Curve of Attached PAC and Resin

A solution of PVP5100 TMS50 with 10% of total sites occupied with 2,1,5-diazonapthoquinone sulfonate and conventional PAC in diglyme was prepared in the ratio 1.0:0.10:4.0. This was then spin coated onto a silicon wafer and soft baked for 30 minutes in a 90° C. convection oven, to a thickness of 0.82 micron.

A scanning wedge experiment as described above gave a gamma value of 1.35 with 5.7% unexposed loss and a resist sensitivity of 173 mJ/cm$^2$ after 4 minutes development time in MF-312.

EXAMPLE 4

Preparation of Bilevel Resist

The resin for the imaging layer was prepared by the thorough mixing of PVP5100 derivatized to 9% silicon with trimethylsilyl groups (about 50% of the —OH sites reacted) (PVP5100 TMS50), a 2,1,5-diazonapthoquinone photoactive compound and diglyme in the ratio of 1:0.25:5 by weight. The solution was filtered under pressure through a 0.3 μm filter and then spun to a 0.5 μm thick coating for testing over a bottom layer of 0.1 μm of S-1400 photoresist which had been baked at 200° C. in a convection over for one hour.

A Perkin-Elmer DRM instrument was used to measure the contrast of this particular system at a thickness of 0.1 μm. The gamma value normalized to 0.1 μm in MF312-CD27 developer at 44 mJ/cm$^2$ (436 nm) broad band irradiation was 1.3.

EXAMPLE 5

Oxygen RIE Pattern Transfer

The transfer of the pattern of the top layer of Example 4 above was accomplished by use of a low pressure oxygen plasma etch. The etcher used was a Plasma-Technologies RIE80 and the following parameters accomplished an essentially total anisotropic etch through the bottom layer without significant debris or grassing in the open areas when looked at in a Scanning Electron microscope. The pressure was 14 mT of oxygen with a DC bias of 350 V between the electrodes the lower of which was graphite covered, grounded and water cooled to 35° C. The power setting was 100 W with a RF frequency of 13.56 MHz. Total etch time was 8 minutes.

EXAMPLE 6

Polymer Blending

A solution of PVP7000 TMS64 (about (10.4% silicon); P7000 TSM43 (about 8% silicon); 2,1,5 diazonaphthoquinone photoactive component and diglyme was made in the ratio of 1:1:0.5:10. This material after filtration through a 0.3 μm filter was spin coated over a 2.0 μm thick coating of poly(methyl)glutarimide which had been convection oven baked for 1 hour at 200° C. The development parameters of this material were more favorable than a resist made to the same total weight percent silicon with only one polymer, for example, steeper sidewalls were seen at submicron geometries.

The above formulation was spin coated to a thickness of 0.5 μm onto a bottom layer over silicon wafers prepared as described in Example 2 and convection oven baked at 90° C. for 30 min.

Exposure was done in hard contact mode on a Canon PLA instrument (broadband) with a light integral setting of 20. Development was for 60 sec in MB351 developer diluted 1:1 with water by immersion.

The smallest line space pairs were limited by the mask used to 0.75 μm.

EXAMPLE 7

Percent Silicon, Tg and Lithographic Ranking

Resists prepared, exposed and developed as described in Example 4 were evaluated using a constant percent PAC and polymers having varying molecular weights and silicon content. The results are shown below. The lithographic ranking was assigned based after looking at the lines of each photoresist via scanning electron microscope ("SEM") photographs to determine wall profiles and resolution.

TABLE 5

| MATERIAL | NMR DETERMINATION % SILICON | Tg | LITHOGRAPHIC RANKING (25% PAC*) |
|---|---|---|---|
| a. P2700T51 | 9.14 | 64 | 3 |
| b. P5700T58 | 10.07 | 101 | 2 |
| c. P7000T43 | 8.40 | 97 | 1 |
| d. P7000T53 | 9.41 | 81 | 4 |
| e. P7000T43 plus P7000T64 | 9.1 | — | 2 |

*A substituted diazonaphthoquinone PAC was used.

EXAMPLE 8

MONOLEVEL RESIST

A partially silylated polymer in accordance with the present invention wherein R is selected from —OH and —OCH$_2$Si(CH$_3$)$_3$ in the ratio 85/15 (about 3% silicon by weight), with 25% by weight of PAC, was imaged in a 1 μm thick layer over metallized (Al-2% Si at 1 μm thick) silicon wafers. The exposure was done with a Canon PLA unit with a light integral of 25 and the development was for 75 s immerson in a 0.3N sodium hydroxide based developer.

The wafers were split into two sets, one of which was placed into a PlasmaTechnologies etcher for 2 minutes at 14 mT of oxygen with a flow rate of 32 sccm and a power setting of 100 W at 13.56 MHz.

Both sets of wafers were then etched for 3 minutes in a DryTech plasma etcher at 150 mT and a power setting of 300 W. The gases used were BCl$_3$ and Cl$_2$ in the ratio of 5:2.

The wafers were evaluated by scanning electron microscopy photographs. These pictures showed that although the metal layer had not been etched cleanly in either case, there was a definite improvement in line slope with the oxygen RIE pretreatment. This treatment has presumably created a SiO$_2$ layer over the photoresist which resisted the chlorine based metal etch better than the resist without treatment. The advantage seen was essentially straight versus sloped sidewalls and an absence of reticulation.

It is understood that the examples and embodiments described herein are for illustrative purposes only and that various modifications or changes in light thereof that will be suggested to persons skilled in the art are to be included in the spirit and purview of this application and the scope of the approved claims.

What is claimed is:

1. A partially silylated polymer, the polymer comprising the repeating unit represented by Formula (I):

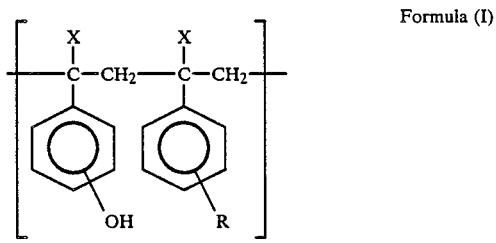

Formula (I)

wherein X is H or CH$_3$; R is —OH or

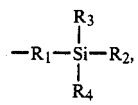

wherein R₁ is —O or —O(CH₂)$_n$, n is 1 to 4, and R₂, R₃ and R₄ are independently selected from 1-4 carbon alkyl, aryl or benzyl, and wherein the average molecular weight of the silylated polymer is from about 2,700 to 22,000 and the average percent by weight silicon is from about 3% to 12%.

2. A silylated polymer in accordance with claim 1 wherein the average molecular weight is from about 2,700 to 7,000.

3. A silylated polymer in accordance with claim 1 wherein the average percent by weight silicon is from about 5% to 11%.

4. A silylated polymer in accordance with claim 1 wherein X is —H, R₁ is —O, R₂, R₃ and R₄ are —CH₃.

5. A silylated polymer in accordance with claim 1 wherein X is —H, R₁ is —OCH₂, R₂, R₃ and R₄ are —CH₃.

6. A partially silylated polymer comprising the reaction product resulting from the reaction of a poly(vinyl)phenol polymer with less than an equivalent of an organosilicon compound capable of transferring a trisubstituted silylmethyl group or trisubstituted silyl group to some of the phenolic hydroxyl groups of the poly(vinyl)phenol polymer; the resulting polymer comprising the repeating structural unit of Formula (I):

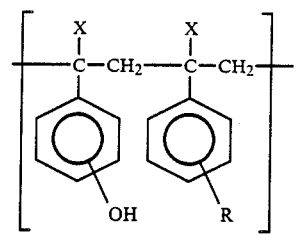

Formula (I)

wherein X is —H or —CH₃; R is —OH or

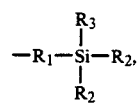

wherein R₁ is —O or —O(CH₂)$_n$, n is 1 to 4, and R₂, R₃ and R₄ are independently selected from 1-4 carbon alkyl, aryl or benzyl, and wherein the average molecular weight of the silylated polymer is from about 2,700 to 22,000 and the average percent by weight silicon is from about 3% to 12%.

7. A silylated polymer in accordance with claim 6, wherein the average molecular weight is from about 2,700 to 7,000.

8. A silylated polymer in accordance with claim 6, wherein the average percent by weight silicon is from about 5% to 11%.

9. A silylated polymer in accordance with claim 6 wherein X is —H; R₁ is —O—; R₂, R₃ and R₄ are —CH₃.

10. A silylated polymer in accordance with claim 6 wherein X is —H; R₁ is —OCH₂; R₂, R₃ and R₄ are —CH₃.

* * * * *